(12) United States Patent
Oomori et al.

(10) Patent No.: US 10,911,612 B2
(45) Date of Patent: Feb. 2, 2021

(54) APPARATUS FOR TRANSMITTING IMAGE, METHOD OF TRANSMITTING IMAGE, COMPUTER-READABLE PROGRAM AND COMPUTER-READABLE STORAGE MEDIUM

(71) Applicant: CANON KABUSHIKI KAISHA, Tokyo (JP)

(72) Inventors: Akira Oomori, Yokohama (JP); Nobuyuki Tonegawa, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/295,483

(22) Filed: Oct. 17, 2016

(65) Prior Publication Data

US 2017/0034367 A1  Feb. 2, 2017

Related U.S. Application Data

(63) Continuation of application No. 11/212,705, filed on Aug. 29, 2005.

(30) Foreign Application Priority Data

Aug. 30, 2004 (JP) .................... 2004-250937
Aug. 4, 2005 (JP) .................... 2005-226533

(51) Int. Cl.
*H04N 1/00* (2006.01)
*H04N 1/32* (2006.01)

(52) U.S. Cl.
CPC ..... *H04N 1/00217* (2013.01); *H04N 1/00212* (2013.01); *H04N 1/00225* (2013.01);
(Continued)

(58) Field of Classification Search
CPC combination set(s) only.
See application file for complete search history.

(56) References Cited

U.S. PATENT DOCUMENTS

| 5,859,967 A | 1/1999 | Kaufeld et al. .................. 726/5 |
| 5,905,783 A | 5/1999 | Tonegawa ................ 379/100.07 |

(Continued)

FOREIGN PATENT DOCUMENTS

| JP | 7-154563 A | 6/1995 |
| JP | 09-247303 | 9/1997 |

(Continued)

OTHER PUBLICATIONS

Xerox CopyCentre C20 WorkCentre M20/M20i User Guide Mar. 10, 2004.*

(Continued)

*Primary Examiner* — King Y Poon
*Assistant Examiner* — Michael Burleson
(74) *Attorney, Agent, or Firm* — Venable LLP

(57) ABSTRACT

An image transmitting apparatus includes a scanner that reads an original, a memory that stores programs, and a processor that executes the programs. The programs are executed to identify destination information of a user for the image transmitting apparatus, and transmit image data corresponding to the read original using the identified destination information in a case where the user does not designate a destination.

5 Claims, 10 Drawing Sheets

(52) U.S. Cl.
CPC ..... *H04N 1/32037* (2013.01); *H04N 1/32048* (2013.01); *H04N 1/32069* (2013.01); *H04N 2201/0094* (2013.01)

(56) References Cited

U.S. PATENT DOCUMENTS

| | | | |
|---|---|---|---|
| 6,094,277 A | 7/2000 | Toyoda | 358/1.15 |
| 6,952,721 B2 | 10/2005 | Tonegawa | 709/206 |
| 7,616,334 B2 | 11/2009 | Niitsuma | 358/1.15 |
| 2003/0002068 A1* | 1/2003 | Constantin | H04N 1/32101 358/1.15 |
| 2003/0067738 A1* | 4/2003 | Rudd | G06F 3/0202 361/679.01 |
| 2004/0223183 A1* | 11/2004 | Oomori | G06F 21/31 358/1.15 |
| 2005/0002057 A1* | 1/2005 | Oe | G06F 12/1458 358/1.15 |
| 2005/0068561 A1 | 3/2005 | Tonegawa | 358/1.13 |
| 2005/0235040 A1 | 10/2005 | Tonegawa | 709/206 |
| 2005/0237569 A1* | 10/2005 | Takahashi | G06F 21/608 358/1.15 |
| 2006/0017965 A1 | 1/2006 | Tonegawa | 358/1.15 |
| 2010/0079794 A1* | 4/2010 | Kim | G06F 3/023 358/1.15 |

FOREIGN PATENT DOCUMENTS

| | | |
|---|---|---|
| JP | 10-32701 | 2/1998 |
| JP | 11-345186 | 12/1999 |
| JP | 2001-103232 A | 4/2001 |
| JP | 2001-282638 A | 10/2001 |
| JP | 2002-140260 A | 5/2002 |
| JP | 2002-344688 | 11/2002 |
| JP | 2003-264663 A | 9/2003 |
| JP | 2003-288307 A | 10/2003 |
| JP | 2004-222141 | 8/2004 |

OTHER PUBLICATIONS

Xerox Corporation, "CopyCentre C20 WorkCentre M20/M20i User Guide, 604E07110," Jun. 16, 2004, pp. i to Page Index—5, URL http://ecl.images-amazon.com/media/i3d/01/A/man-migrate/MANUAL000055061.pdf.

Chinese Office Action, and partial English translation, dated Oct. 19, 2007, regarding Application No. 200510097838.8.

\* cited by examiner

APPARATUS FOR TRANSMITTING IMAGE, METHOD OF TRANSMITTING IMAGE, COMPUTER-READABLE PROGRAM AND COMPUTER-READABLE STORAGE MEDIUM

CROSS REFERENCE TO RELATED APPLICATION

This application is a continuation of U.S. application Ser. No. 11/212,705, filed on Aug. 29, 2005, and also claims foreign priority under 35 U.S.C. § 119 of Japanese Application No. 2004-250937 filed on Aug. 30, 2004 and Japanese Application No. 2005-226533, filed Aug. 4, 2005. The entire disclosures of each of those applications are hereby incorporated by reference in their entireties, as if set forth fully herein.

FIELD OF THE INVENTION

The present invention relates to an image transmitting apparatus and an image transmitting method and, more particularly, to an image transmitting apparatus which can determine efficiently a particular transmission address and an image transmitting method.

BACKGROUND OF THE INVENTION

Image transmitting apparatuses are known which have a procedure for easily designating a destination in which a registered distribution associated with a one-touch button or the like is designated by operating the button, and a destination automatically reflected is fixedly set.

As one of such apparatuses, a facsimile machine disclosed in Japanese Patent Laid-Open No. 7-154563 for example is known. This apparatus is arranged to effectively prevent communication from being erroneously performed by an erroneous input operation, and has a function for inputting call destinations two or more times by one or a plurality of methods. In this function, a calling operation is performed only when items of input information on the party on the other end coincide with each other. If the items of input information on the party on the other end do not coincide with each other, information indicating this non-coincidence state is displayed and the calling operation is not performed. For example, a method of reading a telephone number entered in an original and a method of inputting a telephone number by various operating keys are combined and two numbers input by these methods are collated to each other to ensure error-free communication. A method in which a method for input by using a ten-key cluster in various operating keys and a method for input by using one-touch buttons or abbreviated dialing buttons are combined is being practiced.

In the above-described conventional techniques, however, the setting of the one-touch buttons is not changed even when a user is identified by authentication, and it is necessary for the user to select from a plurality of one-touch buttons for use by him/herself.

In the case of the conventional technique including setting a fixedly-set destination automatically reflected, the destination to be automatically reflected cannot be changed by an authenticated person.

SUMMARY OF THE INVENTION

In view of the above-described problems, an object of the present invention is to provide an image transmitting apparatus and an image transmitting method designed to remove a user's troublesome operation for transmission to the user itself and to effectively improve the facility with which the apparatus is operated. Another object of the present invention is to provide an image transmitting apparatus desired to remove a security hole through which important image information can be transmitted in secrecy.

To achieve the above-described objects, according to the present invention, there is provided an image transmitting apparatus which transmits an image to a predetermined transmission destination, the apparatus including an input unit arranged to input an image to be transmitted, an authentication unit arranged to authenticate a user by user authentication, a user information acquisition unit arranged to obtain transmission destination information associated with the user if the authentication by the authentication unit is successful, a transmission destination designation unit arranged to designate a transmission destination to which the image should be transmitted, a determination unit arranged to determine, according to details of the transmission destination designated by the transmission destination designation unit, whether or not the image should be transmitted to the transmission designation associated with the user, and a transmission unit arranged to transmit the image based on the result of determination made by the determination unit.

According to the present invention, there is also provided an image transmitting apparatus which transmits an image to a predetermined transmission destination, the apparatus including an input unit arranged to input an image to be transmitted, an administrator authentication unit arranged to authenticate administrator authority by user authentication, a transmission destination information setting unit arranged to set transmission destination information if the authentication by the administrator authentication unit is successful, a transmission destination designation unit arranged to designate a transmission destination to which the image should be transmitted, and a transmission unit arranged to transmit the image to the transmission destination designated by the transmission destination designation unit and to a transmission destination according to the transmission destination information set by the transmission destination information setting unit.

According to the present invention, there is also provided an image transmitting method in which an image is transmitted to a predetermined transmission destination, the method including a inputting step of inputting an image to be transmitted, an authentication step of authenticating a user by user authentication, a user information acquisition step of obtaining transmission destination information associated with the user if the authentication in the authentication step is successful, a transmission destination designation step of designating a transmission destination to which the image should be transmitted, a determination step of determining, according to details of the transmission destination designated in the transmission destination designation step, whether or not the image should be transmitted to the transmission designation associated with the user, and a transmission step of transmitting the image based on the result of determination made by the determination unit.

According to the present invention, there is further provided an image transmitting method in which an image is transmitted to a predetermined transmission destination, the method including a inputting step of inputting an image to be transmitted, an administrator authentication step of authenticating administrator authority by user authentication, a transmission destination information setting step of setting transmission destination information if the authentication in the administrator authentication step is successful, a transmission destination designation step of designating a transmission destination to which the image should be transmitted, and a transmission step of transmitting the image to the transmission destination designated in the transmission destination designation step and to a transmission destination according to the transmission destination information set in the transmission destination information setting step.

Other features of the present invention will become apparent from the following description of the best mode for carrying out the invention in conjunction of the accompanying drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

First Embodiment

A first embodiment of the present invention will be described with reference to the drawings.

Figure 1A:
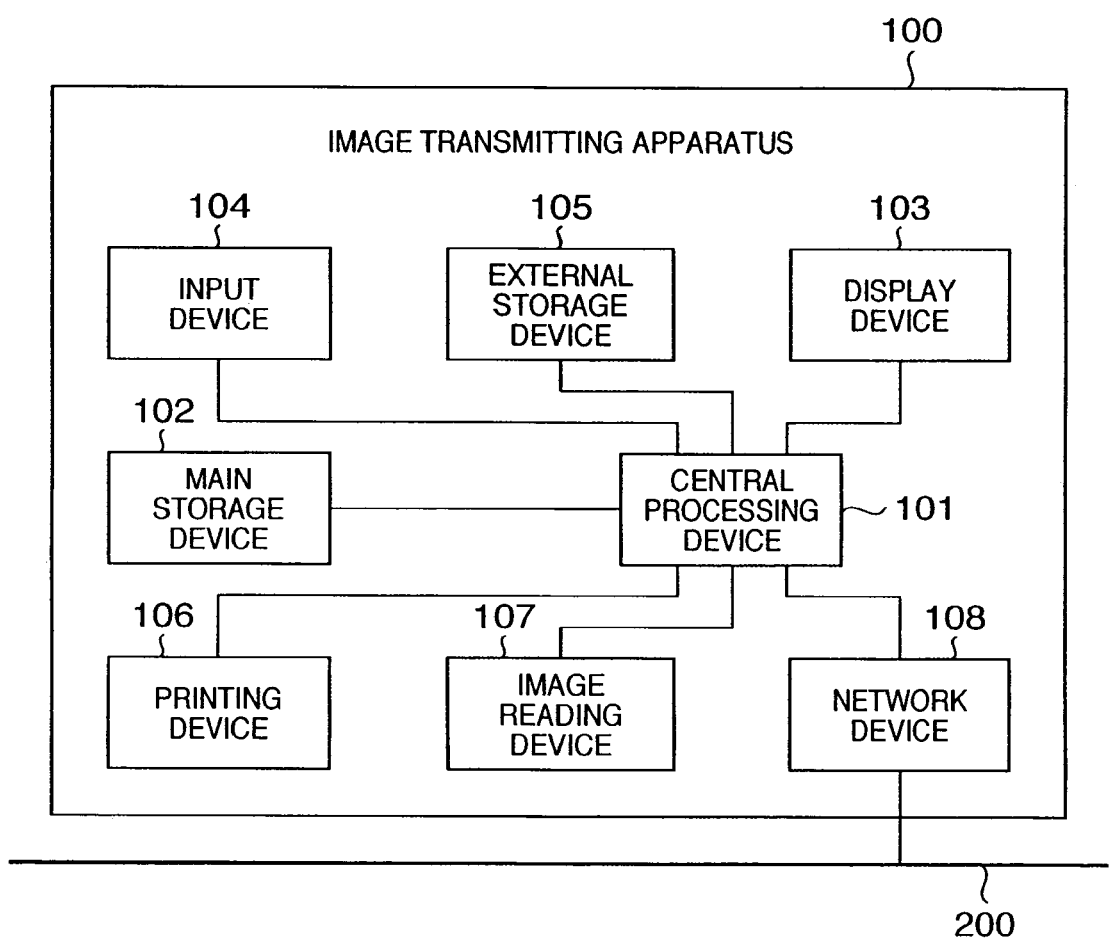
FIG. 1A is a block diagram showing the configuration of an image transmitting apparatus 100 according to each of embodiments of the present invention.

FIG. 1A is a block diagram showing the configuration of an image transmitting apparatus 100 according to the first embodiment. The image transmitting apparatus 100 incorporates a scanner and a printer and has a copying function, FAX transmitting and receiving functions, a printer function to print data prepared on a computer, and other functions. An essential section of the image transmitting apparatus is constituted by a central processing device 101, a main storage device 102, a display device 103, an input device 104, an external storage device 105, a printing device 106, an image reading device 107 and a network device 108. The image transmitting apparatus 100 may have a formatter section having a parallel interface in accordance with IEEE1284 and a personal computer interface (PC I/F) circuit for a universal serial bus (USB) or the like. The formatter section is a rendering circuit for preparing image data based on a page-description language (PDL) data received from a personal computer through the PC I/F circuit or the network I/F circuit, performing image processing with the central processing device 101, and performing printing with the printing device 106. The image transmitting apparatus 100 may also have a facsimile I/F circuit connected to a telephone circuit and constituted by a network control unit (NCU) and a modulator/demodulator (MODEM). Image data read by the image reading device 107 undergoes image processing in the central processing device 101 and is transmitted to a facsimile machine via the telephone circuit. When data transmitted from a facsimile machine is received, the central processing device 101 performs image processing on the received data and the printing device 106 performs printing using the data. The printing device 106, the image reading device 107 and the central processing device 101 are connected to a high-speed video bus different from a CPU bus from the central processing device 101 to enable image data to be transferred at a high rate. The central processing device 101 performs image processing on image data read by the image reading device 107 and the printing device 106 performs printing using the read data, thus performing the copying function. The image transmitting apparatus 100 has a sending function to transmit, through the network device 108, onto a network 200, image data read by the printing device 106 and processed by image processing in the central processing device 101. The image transmitting apparatus 100 also has an IFAX function to prepare an image in accordance with RFC2301 by means of the central processing device 101 and to transmit/receive this kind of image by using an electronic mail protocol.

The central processing device 101 controls the main storage device 102, the display device 103, the input device 104, the external storage device 105, the printing device 106, the image reading device 107 and the network device 108 and have a role to perform operations based on the four rules of arithmetic, and logical operations. The central processing device 101 also includes a large-capacity image memory, an image rotation circuit, a resolution conversion circuit, a coding/decoding circuit for processing in accordance with various standards: Modified Huffman (MH), Modified Read (MR), Modified Modified Read (MMR), Joint Bi-level Image experts Group (JBIG) and Joint Photographic Experts Group (JPEG). The central processing device 101 can execute various kinds of image processing such as shading, trimming and masking by using programs stored in the main storage device 102.

The main storage device 102 is a device using a large-capacity storage medium and connected through a network I/F such as SCSI or USB. The large-capacity storage medium may be a hard disk or a recording medium such as a magneto-optical (MO) disk. The main storage device 102 is capable of storing information necessary for predetermined image processing in the image transmitting apparatus 100 and taking out the information as occasion demands. As the network I/F, a circuit capable of implementation of a network data link for connection to a network circuit, e.g., an Ethernet link typified by 10BASE-T or 100BASE-T, or a token ring may be used.

The display device 103 displays processing results in the forms of figures, characters and the like. A touch panel display is provided as the display device 103.

The input device 104 provides various inputs to the central processing device 101 (e.g., an instruction to perform a predetermined operation). A keyboard and a touch panel are provided as the input device 104. To enable a user operation to be smoothly executed, the input device 104 displays a button on a liquid crystal display (LCD) by using software and detects the touch of a user's finger and the like on the button.

The external storage device 105 is a memory for storing various sorts of information. For example, the external storage device 105 is a magnetic recording storage device or a magneto-optic recording device. The external storage device 105 is capable of storing image data on an image obtained by scanning, image data on an image received by communication, and the like. Image data stored in the external storage device 105 can be printed by the printing device 106 or transmitted by commanding a transmission according to a manual transmission procedure.

The printing device 106 is a circuit for printing electrical image data on recording paper. Laser light corresponding to electrical image data is emitted from a laser emission unit. A surface of a photosensitive drum is irradiated with the laser light to form a corresponding latent image. A developer is attached to latent image portions of the photosensitive drum by a development device. A sheet of recording paper is fed from a paper feed cassette to a transfer section by timing synchronized With the start of irradiation with the laser light. The developer attached to the photosensitive drum is transferred to the recording paper sheet in the transfer section. The sheet of recording paper carrying the developer is transported to a fixation section and the developer is fixed on the recording paper sheet by heat and pressure in the fixation section. The recording paper sheet passed through the fixation section is discharged by a discharge roller. The recording paper sheet is accommodated in a corresponding bin by a sorter which performs sorting of recording paper sheets on which printing is performed as described above.

The image reading device 107 is a circuit for converting image data on an original into electrical data by photoelectric conversion. When an original is transported from an original feed device onto a platen glass and set on the platen glass, the image reading device 107 lights a lamp and starts moving a scanner unit and exposure scanning on the original. Reflected light from the original is guided to a CCD image sensor by a mirror and a lens and is converted into an electrical signal by the CCD image sensor. This electrical signal is converted into digital data by an A/D conversion circuit. After the completion of the original reading operation, the original on the platen glass is removed.

A name of a user, a password and a mail address of the user are stored as authentication data in the external storage device 105. A communicable connection is made to an authentication server 109' shown in FIG. 1B. The authentication server 109 performs authentication based on the authentication data. For authentication to the authentication server 109, an authentication method using Kerberos, a network application hierarchical program standardized as RFC1510, for example, may be used. In this authentication method, KEB_AS_REQ (Kerberos authentication service request) is first set from the client image transmitting apparatus 100 to the authentication server 109 to execute an inquiry as to whether or not the user is authenticated. A log-on session key and client authentication data encrypted as KEB_AS_REP (Kerberos authentication service reply) are returned to the image transmitting apparatus 100. KEB_TRG_REQ (Kerberos ticket granting service request) is prepared from this data to execute a request of the authentication server 109 for qualification information. Encrypted client authentication data is returned as KEB_T-RG_REP (Kerberos ticket granting service reply) from the authentication server 109. KEB_AP_REQ (Kerberos application request) is prepared from this data for request of the authentication server 109 for service use permission. Data is returned as KEB_AP_REP (Kerberos application reply) from the authentication server 109. If the returned data is normal and if time data in the reply data is correct, "authentication OK" is recognized.

While an example of making three requests of one authentication server has been described, a plurality of servers may be used according to a network configuration for example. Also, a different authentication method such as DH authentication may alternatively be used.

Figure 1B:
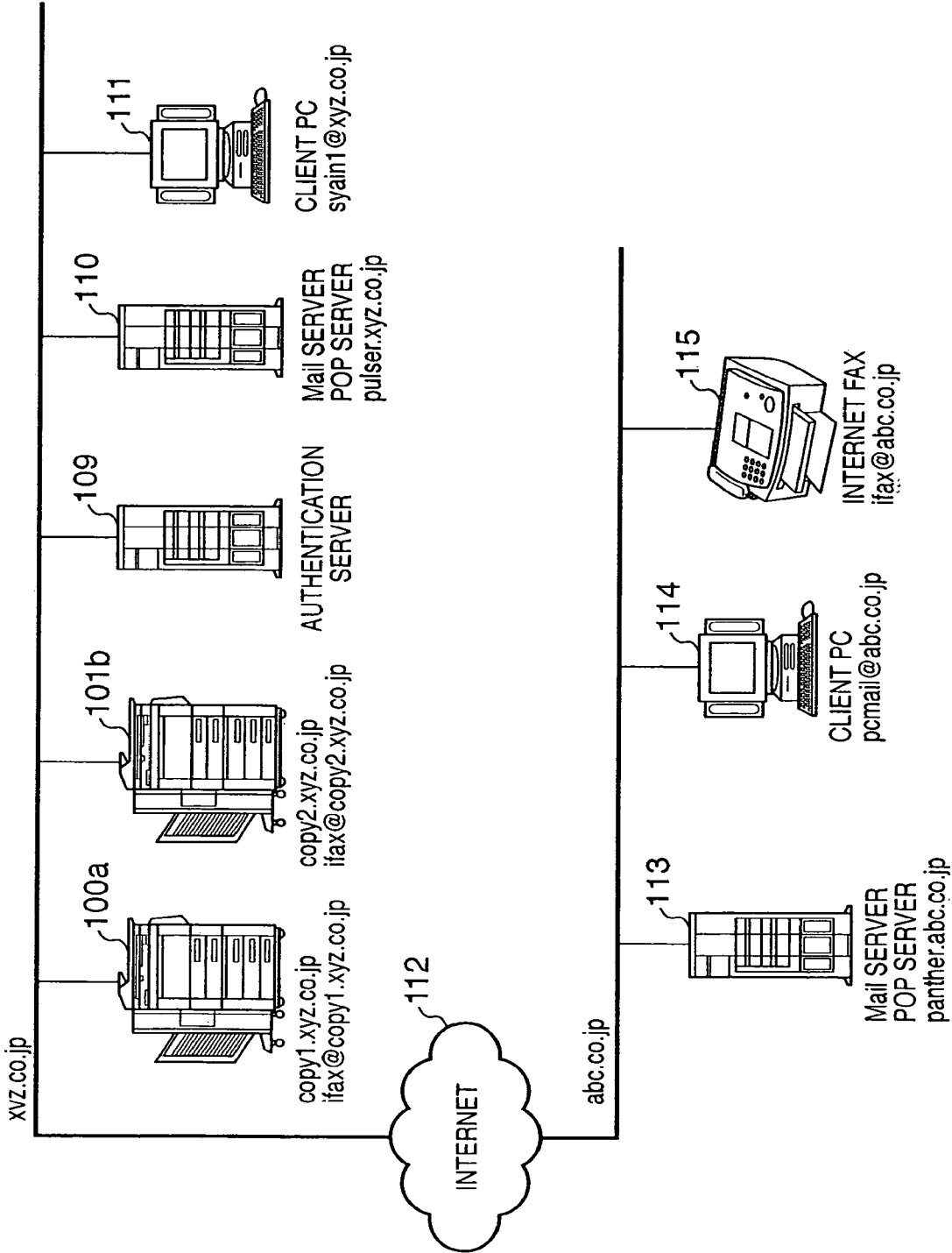
FIG. 1B is a diagram showing a network connection configuration of the image transmitting apparatus.

FIG. 1B is a block diagram showing a network connection configuration of the image transmitting apparatus according to the first embodiment. Image transmitting apparatuses 100a and 100b are connected to a network having a domain name: xyz.co.jp to be connected to a plurality of computers and pieces of network equipment such as a mail server/POP server 110 and a client PC 111. This network is connected to the Internet 112 extending throughout the world and is also connected to a network at abc.co.jp to which a mail server/POP server 113, a client PC 114 and an Internet FAX 115 are connected.

The image transmitting apparatus 100a is given a HOST name: copy1.xyz.co.jp and an electronic mail address: ifax@copy1.xyz.co.jp uniquely assigned thereto. The image transmitting apparatus 100b is given a HOST name: copy2.xyz.co.jp and an electronic mail address: ifax@copy2.xyz.co.jp uniquely assigned thereto.

The authentication server 109 is a server for performing user authentication in this domain. User names and passwords valid in this domain are stored in the authentication server 109. When power for the client PC 111 is turned on, input of a user name and a password is demanded. When a user name and a password are input, an inquiry is made of the authentication server 109 whether or not the user name and the password are correct. If the user name and password of the user are registered, the client PC is usable under the authenticated user name. A piece of general-purpose electronic mail is installed in the PC 111, and a mail address: syain1@xyz.co.jp is assigned to the PC 111. The mail server/POP server 110 is a server having both a mail server function and a POP server function. The mail server/POP server 113 also has similar functions.

When a piece of electronic mail is sent from the client PC 111 to pcmail@abc.co.jp, it is delivered to the mail server 110 by the simple mail transfer protocol (SMTP). The electronic mail data is delivered from the mail server 110 to the mail server 113 via the Internet 112 by the SMTP protocol to be stored in a mail box at pcmail@abc.co.jp.

A piece of general-purpose electronic mail is also installed in the client PC 114. The client PC 114 monitors, at certain intervals, by using the post office protocol-version 3 (POP3), whether or not any piece of electronic mail has been delivered to the mail box at pcmail@abc.co.jp existing in the POP server 113. If a piece of electronic mail has been delivered to the POP server 113, the client PC 114 receives the mail data.

When a piece of electronic mail is sent from pcmail@abc.co.jp of the client PC 114 to syain1@xyz.co.jp of the client PC 111, the route is used. Mail data prepared by the general-purpose electronic mail software in the PC 114 is repeated by the mail server 113 to be sent to the mail server 110 and stored in the mail box at syain1@xyz.co.jp in the POP server 110.

The client PC 111 operates so as to obtain the mail data delivered from the mail box at syain1@xyz.co.jp by the POP3 protocol.

The image transmitting apparatuses 100*a* and 100*b* have an Email transmission mode and an IFAX transmission mode. The Email transmission mode is a mode in which an image received by the FAX or IFAX receiving function or a black and white/color image read by the scanner is transmitted by assuming transmission to an ordinary electronic mail address. The IFAX transmission mode is a mode with the assumption that transmission to a machine in conformity with the IFAX standard is performed. The image transmitting apparatuses 100*a* and 100*b* use SMTP and POP3 for transmission/reception and perform the same operation as the above-described transmitting/receiving operation of the client PC 111 and client PC 114.

In the Email transmission mode, when a color image is read by the scanner, it is transmitted in the JPEG format or in a portable document format (PDF) file. When a black and white image is read, it may be transmitted in the tagged image file format (TIFF) and the portable document format (PDF). When an image is transmitted to the mail address: syain1@xyz.co.jp, the client PC 111 can receive the mail by the POP3 protocol and display the image by means of a general-purpose viewer.

In the IFAX transmission mode, an image read by the scanner is transmitted as an image in TIFF in accordance with RFC2301 to the image transmitting apparatus 100*a* or 100*b* or the Internet FAX 115 in conformity with the IFAX standard by the POP3 protocol and the SMPT. Image data received by the scanner, FAX or IFAX function of the transmitter is received by the receiver in a remote place and the received image is printed by the printer.

The network program for the image transmitting apparatus is roughly divided into three hierarchical layers of the program: IP, TCP/UDP and application layers.

IP is an internet protocol layer for offering a service to deliver a message from a sending host to a destination host in cooperation with a repeater node such as a router. In IP, a routing function is performed to manage the addresses of senders transmitting data and the addresses of destinations where data is received and to manage delivery as to through what route in the network data is delivered to a destination host according to address information.

TCP/UDP is a transport layer for offering a service to deliver a message from a sending application process to a receiving application process. TCP is a connection type of service assuring high communication reliability, while UDP is a connectionless type of service not assuring reliability.

A protocol in the application layer specifies a plurality of protocols, in which the file transport protocol (FTP), the simple network management protocol (SNMP), the line printer daemon (LPD), the hypertext transfer protocol daemon (HTTPd), SMTP, POP3 and the lightweight directly access protocol (LDAP) exist. The Kerberos authentication program specified in RFC1510 is also incorporated.

Figure 2:
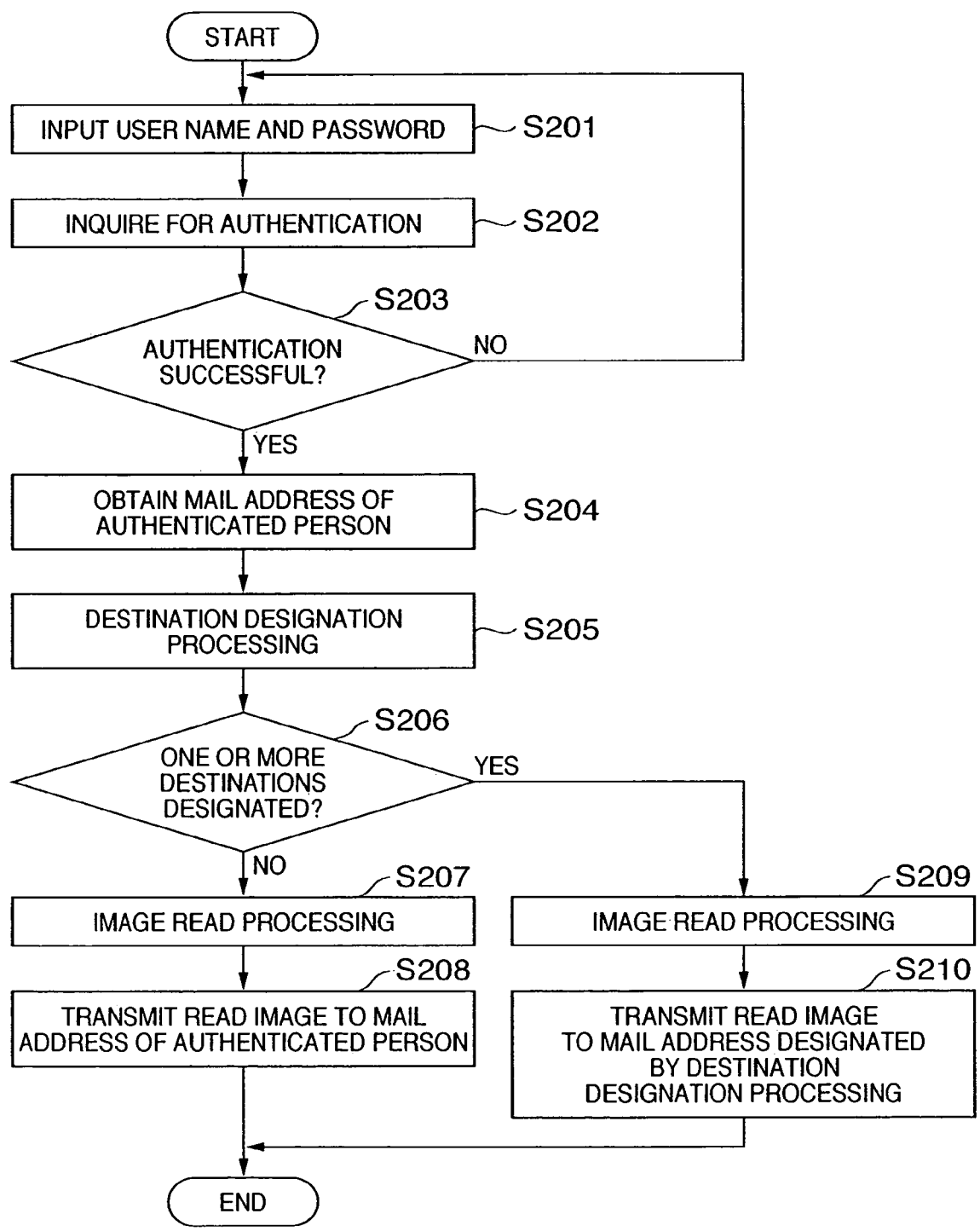
FIG. 2 is a flowchart for explaining the operation of the first embodiment.

The operation of the image transmitting apparatus in the first embodiment will be described with reference to the flowchart of FIG. 2. The central processing device 101 controls the operation described below.

When the main power supply for the image transmitting apparatus 100 is turned on, it executes initialing operations for initializing the memory, the I/O port and so on and executes log-in processing if a system user setting has been made to "do" "user authentication". In this state, processing such as copying requiring involvement of a user operation cannot be executed and the input device 104 displays a graphical interface view for input of a user name. When log-in processing is executed, the image transmitting apparatus of this embodiment starts operating.

In step S201, a user name and a password for authentication of the right to use the image transmitting apparatus 100 shown in FIG. 1A are input through the input device 104. In step S202, an authentication operation is executed by the authentication server 109. The authentication server 109 executes the authentication operation based on user information including user names, passwords and electronic mail addresses and a program for referring to and editing the contents of the user information. "User names" refer to user names usable by computers in the domain xyz.co.jp and the principal of which the authentication server 109 have charge. Passwords are registered while being associated with the user names but ***** or the like are displayed for the passwords in order that the password cannot be easily seen. Electronic mail addresses usable by the registered users are registered.

In step S203, determination is made as to whether or not authentication executed in step S202 is successful. That is, determination is made as to whether or not a match occurs between the input user name and password and the user names and passwords registered in the authentication server 109. If the authentication is successful, the process advances to step S204. If the authentication is unsuccessful, the process returns to step S201. Thus, awaiting a user name and a password is continued to prohibit the next operation.

In step S204, an operating interface view is opened to grant the right to use the image transmitting apparatus. In step S204, the mail address of the user identified by authentication is obtained from the authentication server 109 by using the LDAP communication protocol.

In step S205, the user inputs commands to designate a scanner read resolution and an electronic mail transmission destination. A destination to which a read image will be sent is input through the input device 104 (destination input processing). In this step, the user inputs characters one after another by an operation using numeral buttons or alphabet buttons or inputs a group of characters of a high expected frequency of use, e.g., ".co.jp" or ".com" at a time by using a particular button. Alternatively, input is done by selecting a desired address from an address book in the external storage device 105 in Which a plurality of addresses are registered. It is permitted to terminate processing without inputting any destination in step S205.

In step S206, determination is made as to whether one or more or no destinations are designated in step S205. If no destinations are designated, the process moves to step S207. If one or more destinations are designated, the process moves to step S209.

In step S207, an image is read by the image reading device 107. In step S208, the read image is transmitted to the mail address of the user obtained in step S204. This processing will be described with reference to FIG. 8. If by processing in steps 206, 207 and 208 transmission is performed without any destination designated, control is performed so that the image is transmitted to the mail address of the user automatically authenticated based on the authenticated information.

In step S209, the image is read by the image reading device 107. In step S210, control is performed so that the read image is transmitted to the destination designated in step S205. After transmission, the user name designated at the time of log-in, transmission destination information, the transmission date, the transmission time, the number of pages transmitted, transmission results and other information are written in a log. After writing in the log, a transmission result report for notifying transmission results is made. Alternatively, a communication management report is made when a certain number of transmission events is reached. This report, having user names entered therein, enable identification of persons who have performed transmission in transmission jobs. The data written in the log can also be displayed in a list on the input device 104. Also, a communication log in which the user names are entered can be displayed through a WWW browser in the client PC on the network by preparing an HTML file from the registered data and performing an HTTP server function. While an example of the system in which the authentication server 109 is connected in a network has been described, the authentication server function may be incorporated in the MFP. Also, one MFP may perform the authentication server function to obtain the same effect in a case where a plurality of MFPs are provided as well as in a case where only one MFP is provided.

Figure 8:
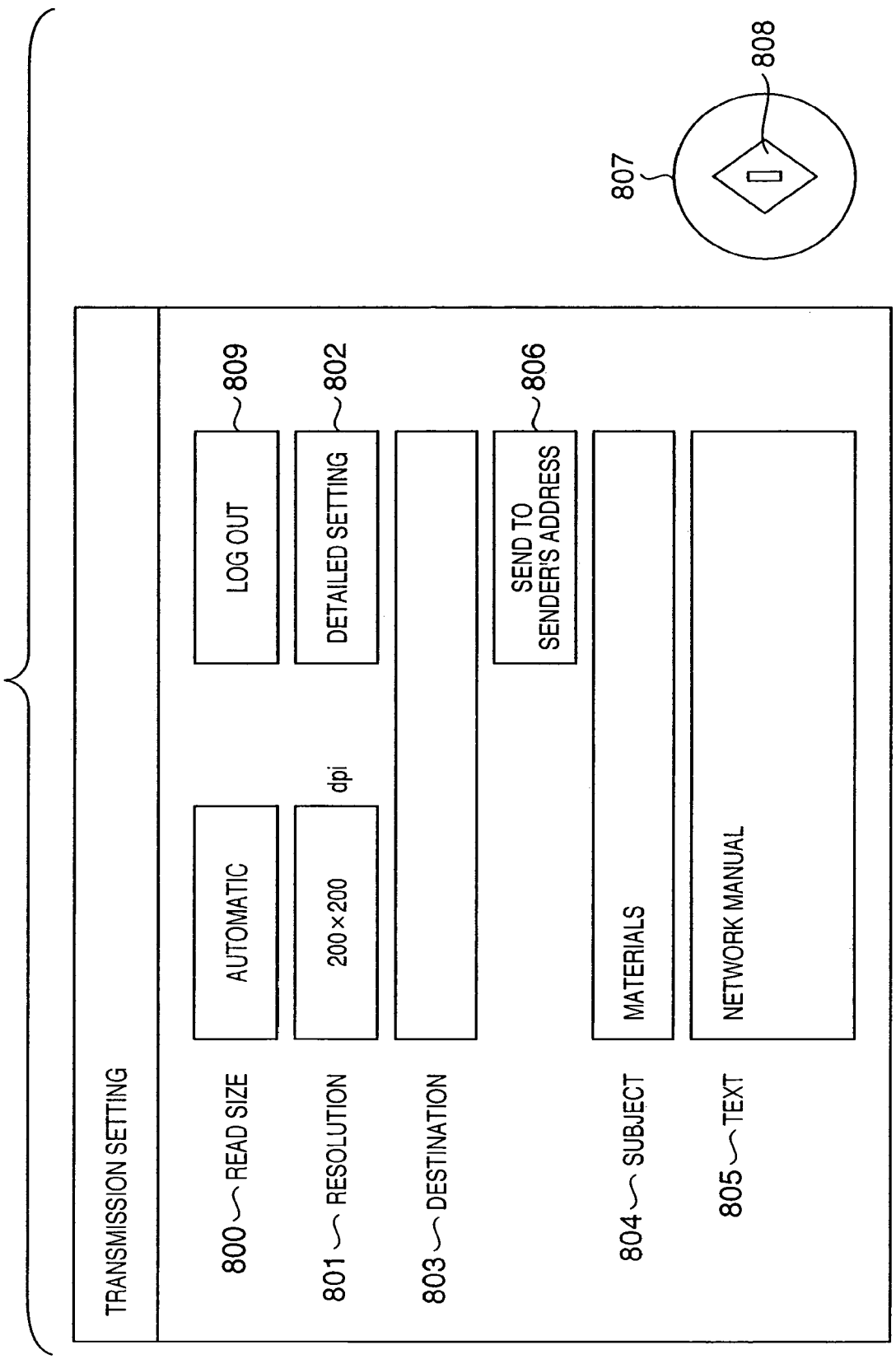
FIG. 8 is a diagram showing a transmission setting interface view in the image transmitting apparatus.

After the Image has been transmitted, a log-out key 809 shown in FIG. 8 is pressed to execute log-out processing, thereby completing the process. The state of the input device 104 is returned to the interface view for inputting a user name.

FIG. 8 shows a transmission setting interface view on the input device 104 displayed when image data read by the image reading device 107 is transmitted by electronic mail in step S208 or S209. In Read Size 800, a size in which the original is read by the image reading device 107 can be designated. For example, one of sheet sizes, e.g., A3, A4, A5, B4, B5, 11*17, LTR and STMT and an orientation in which the sheet is placed can be designated. In the case of a setting shown in FIG. 8, "Automatic" is selected and values detected by an original detection sensor provided in the image reading device 107 are read to determine the size and orientation. In Resolution 801, a resolution at which the image reading device 107 reads an image can be designated. Selection can be made from 200*100, 200*200, 200*400, 300*300, 400*400 and 600*600 dpi.

In the setting shown in FIG. 8, a default value "200*200" dpi is set. In Detailed Setting 802, operation details at the time of scanning, e.g., a density setting, an original type designation, two-side read, continuous page designation and image quality adjustment can be selected. As a method of designating an electronic mail transmission destination, two methods exist: a method of selecting in Destination 803 one of destinations registered in an address book containing a record of addresses designated by the user in the past, and a method of selecting "Send to Sender's Address" button 806 to set as a transmission destination the electronic mail address of the user who logged in. The "Send to Sender's Address" button is displayed or made active only when the image reading device 107 is set in a mode of executing user authentication (hereinafter referred to as "user authentication mode").

The "Address Book" is a database for managing transmission destinations in a user mode (not shown) in which information on various settings in the machine is registered and managed. Registration, change and deletion of a transmission destination can be executed in the user mode. Even a user who does not have the system administrator authority can execute registration, change and deletion operations for example. Electronic mail addresses for transmission destinations are displayed in an address section and "Select" is checked to send a piece of electronic mail to the corresponding destination. The selected address is displayed as the destination and shown in the electronic mail "To:" field. The Email transmission mode in which transmission to an ordinary electronic mail address selected as a transmission destination is assumed or the IFAX transmission mode in which transmission to an IFAX machine having mutual transmitting and receiving functions is assumed can be designated. While data in either of the TIFF, JPEG and PDF image formats can be transmitted to each Email transmission destination, data to IFAX destinations is limited to files In TIFF specified in RFC2301. While images to be transmitted in the Email transmission mode are images read by the scanner, the number of pixels in main scanning is determined in the IFAX transmission mode. Therefore, predetermined image conversion and impartation of an image in which a transmission destination, a sender electronic mail address, a transmission starting time and a page number are described for recognition of from which place to which place an image is transmitted are carried out. An address book for common use by all users without user authentication and address books each provided for use by one user may be provided as the above-described address book. The address book for common use is usable without user authentication or is made usable by any user if the user is authenticated. The address book for each user is made usable for the user after authentication of the user.

When "Send to Sender's Address" button 806 is selected, the electronic mail address of the user who logged in is obtained from the server and the obtained electronic mail address is set in the electronic mail "To" Field. Since the transmission destination is the name of the user who logged in, a different transmission destination is set when a different user logs in. When "Send to Sender's Address" button 806 is selected, it is displayed in gray. "Send to Sender's Address" button 806 is changed between the selected state and the unselected state each time it is pressed. Subject 804 and Text 805 are for a subject line attached to a piece of electronic mail to be transmitted and a mail text in the piece of electronic mail. When one of these setting sections is selected, a software keyboard is displayed to enabling input of a sequence of characters. A start key 807 is a hardware key provided by the side of the input device 104. Drive of the image reading device 107 can be started by pressing this key. Blue and red light emitting diodes (LEDs) 808 are mounted at a center of the start key 807. In a case where no transmission destination is designated, the red LED is lighted to inform the user of a state where the image reading device 107 cannot be driven even if the start key 807 is pressed. If at least one transmission destination is designated, the blue LED is lighted to inform the user of a state where the scanner can be driven. When "Send to Sender's Address" button 806 is selected in a case where no transmission destination is designated in Destination 803, the blue LED is lighted to enable scanning. However, if "Send to Sender's Address" button 806 is in the unselected state, the red LED in the start key 807 is lighted and the image reading device 107 cannot be driven even if the start key 807 is pressed. When Log-Out 809 is pressed, the display view on the input device 104 is changed to a user log-in interface view and the operation by the user who logged in ends.

According to the first embodiment, security can be assured by performing authentication processing, as described above. Also, a read image can be transmitted to a desired destination. Even if no destination is designated, an image can be transmitted to an address for a user who logged in. The need for a troublesome user operation is eliminated. Thus, the image transmitting apparatus advantageously easy to use can be implemented.

Second Embodiment

The configuration of an image transmitting apparatus 100 according to a second embodiment of the present invention is the same as that according to the first embodiment. Therefore the configuration of the apparatus in the second embodiment will not be described.

Figure 3:
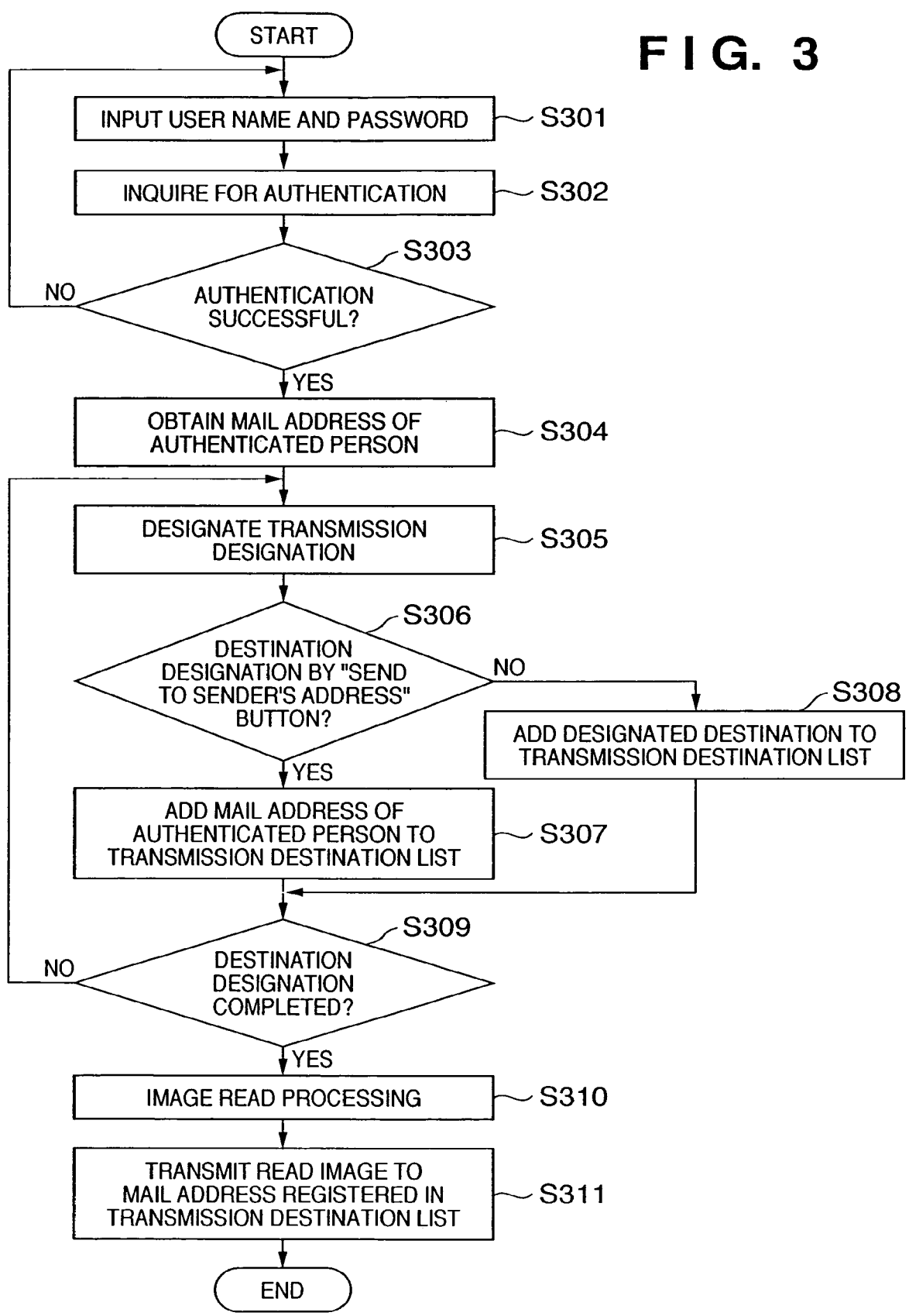
FIG. 3 is a flowchart for explaining the operation of the second embodiment.

The operation of the image transmitting apparatus according to the second embodiment will be described in detail with reference to FIG. 3.

In step S301, a user name and a password for authentication of the right to use the image transmitting apparatus 100 are input through the input device 104. In step S302, authentication processing by means of the authentication server 109 is executed.

In step S303, determination is made as to whether or not authentication in step S302 is successful. If the authentication is successful, the process advances to step S304 and the operating interface view is opened to grant the light to use the image transmitting apparatus 100. If it is determined that the authentication is unsuccessful, the process returns to step S301 and input of a user name and a password is again awaited, thereby prohibiting execution of the next operation.

In step S304, the mail address of the user identified by authentication is obtained from the authentication server 109. In step S305, a transmission destination is input through the input device 104 or through the touch panel of the display device 103. In step S305, the "Send to Sender's Address" button is being displayed by the display device 103. The "Send to Sender's Address" button may be pressed to immediately designate the Sender's Address without inputting the sequence of address characters.

In step S306, determination is made as to whether or not the "Send to Sender's Address" button is pressed. If it is determined that the "Send to Sender's Address" button is pressed, the process advances to step S307 and the address of the authenticated user obtained in step S304 is added to the transmission destination list.

If it is determined in step S306 that the "Send to Sender's Address" button is not pressed, the process moves to step S308 and the input sequence of characters is added as a transmission destination to the transmission destination list.

After execution of processing in steps S307 and S308, determination is made in step S309 as to whether or not destination designation processing is completed. If the processing is not completed, the process returns to step S305 for input of the next destination. If the processing is completed, the process advances to step S310.

In step S310, an image is read by the image reading device 107. In step S311, the read image is transmitted to the destinations in the transmission destination list designated in steps S305, S306, S307, and S308.

According to the second embodiment, security can be assured by performing authentication processing, as described above. Also, a user can designates his/her Sender's Address as an image transmission destination by performing a button pressing operation only one time. Thus, the need for a troublesome user operation is eliminated and the image transmitting apparatus advantageously easy to use can be implemented.

Third Embodiment

The configuration of an image transmitting apparatus 100 according to a third embodiment of the present invention is the same as that according to the first embodiment. Therefore the configuration of the apparatus in the third embodiment will not be described.

The operation of the image transmitting apparatus according to the third embodiment will be described in detail with reference to FIGS. 4 and 5.

Figure 4:
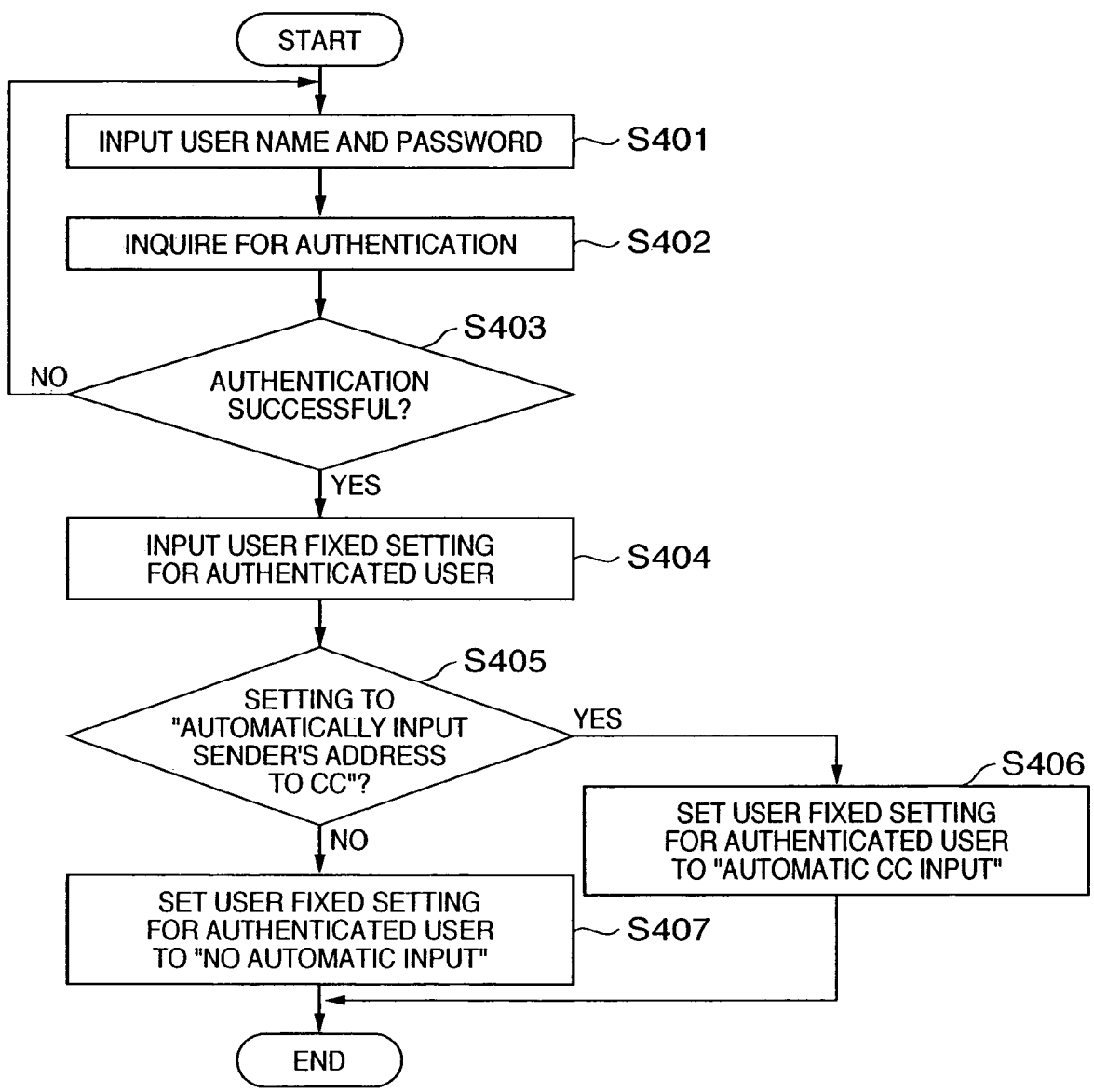
FIG. 4 is a flowchart showing processing for storing a fixed setting for each user in the image transmitting apparatus in a case where the image transmitting apparatus is used by identifying each user through authentication in the third embodiment.

FIG. 4 is a flowchart showing processing for storing a fixed setting for each user in the image transmitting apparatus 100 in a case where the image transmitting apparatus 100 is used by identifying each user through authentication.

Referring to FIG. 4, in step S401, a user name and a password for authentication of the right to use the image transmitting apparatus 100 are input through the input device 104. In step S402, authentication processing by means of the authentication server 109 is executed.

In step S403, determination is made as to whether or not the authentication is successful. If the authentication is successful, the process advances to step S404 and the operating interface view is opened to grant the light to use the image transmitting apparatus 100. If it is determined that the authentication is unsuccessful, the process returns to step S401 and input of a user name and a password is again awaited, thereby prohibiting execution of the next operation.

In step S404, a fixed setting for each user stored on a user-by-user basis in the external storage device 105 of the image transmitting apparatus 100 is input. In the fixed setting for each user, a setting can be made to "Automatically Input Sender's Address as CC Destination".

In step S405, determination is made as to whether or not the fixed setting for each user input in step S404 is a setting to "Automatically Input Sender's Address as CC Destination". If the fixed setting corresponds to the "Automatic Input" setting, the process advances to step S406 and the setting to "Automatically Input Sender's Address as CC" is Stored in the external Storage device 105 as the fixed setting for the authenticated user. If the fixed setting does not corresponds to the "Automatic Input" setting, the process moves to step S407 and a setting "Not to Automatically Input Sender's Address as CC" is stored in the external storage device 105 as the fixed setting for the authenticated user, thereby terminating the process shown in FIG. 4. The address may be set as a CC destination (broadcast destination) or as a BCC destination (anonymous broadcast destination).

Figure 5:
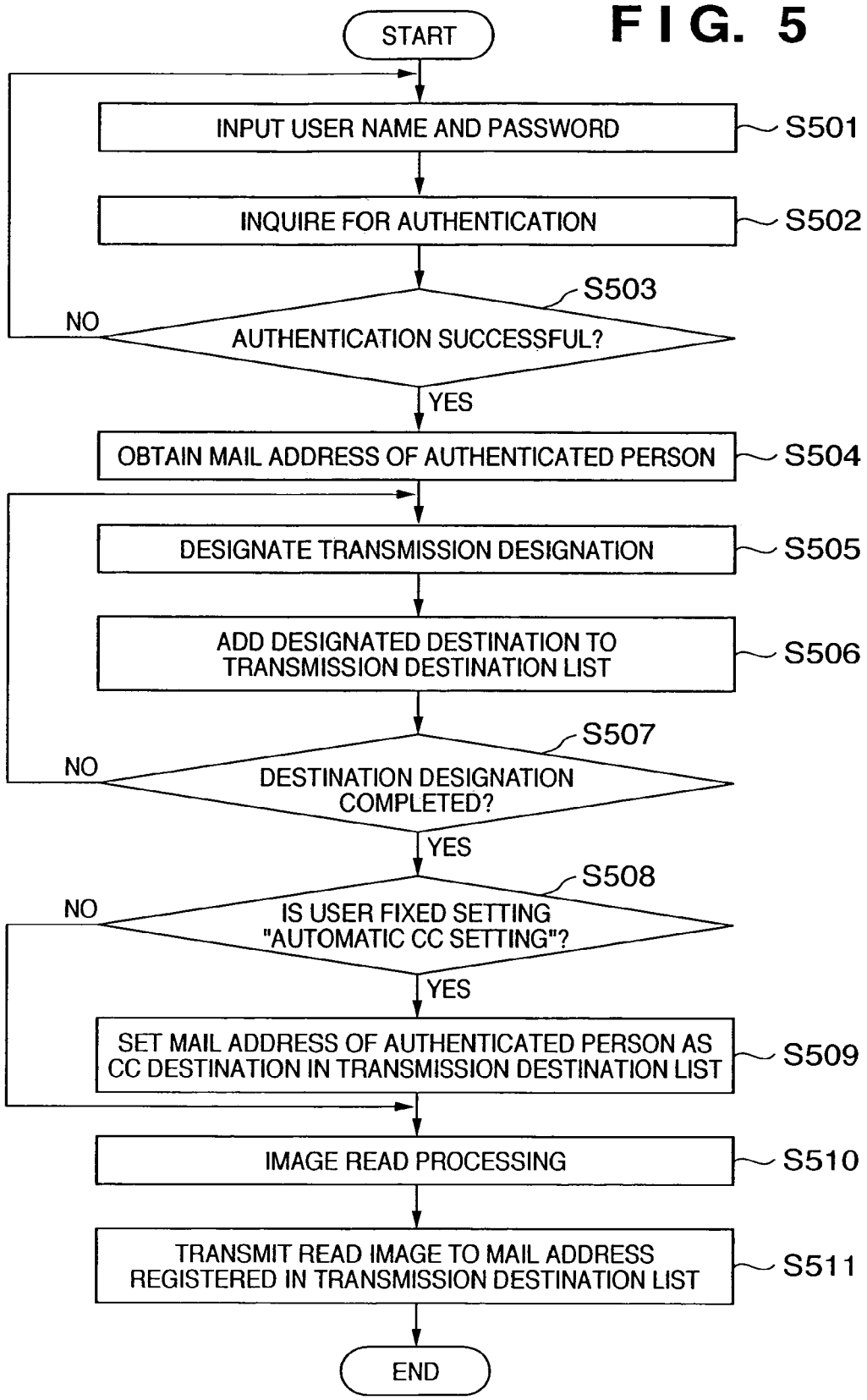
FIG. 5 is a flowchart for explaining the main operation in the third embodiment.

FIG. 5 is a flowchart for explaining the main operation in the third embodiment.

In step S501, a user name and a password for authentication of the right to use the image transmitting apparatus 100 are input through the input device 104. In step S502, authentication processing by means of the authentication server 109 is executed.

In step S503, determination is made as to whether or not the authentication is successful. If the authentication is successful, the process advances to step S504 and the operating interface view is opened to grant the light to use the image transmitting apparatus 100. If the authentication is unsuccessful, the process returns to step S501 and input of a user name and a password is again awaited, thereby prohibiting execution of the next operation.

In step S504, the mail address of the user identified by authentication is obtained from the authentication server 109. In step S505, a transmission destination is input through the input device 104 or through the touch panel of the display device 103.

In step S506, the input sequence of characters is added as a transmission destination to the transmission destination list.

In step S507, determination is made as to whether the destination designation processing is completed. If the destination designation processing is not completed, the process returns to step S505 for input of the next destination. If the destination designation processing is completed, the process advances to step S508. In step S508, the fixed setting for each user stored as described with reference to the flowchart of FIG. 4 is referred to. If the fixed setting is to "Automatically Input Sender's Address as CC Destination", the process advances to step S509 and the mail address of the user obtained in step S504 is added to the transmission destination list. If the fixed setting is not to "Automatically Input Sender's Address as CC Destination", processing in step S509 is skipped.

In step S510, an image is read by the image reading device 107. In step S511, the read image is transmitted to the destinations in the transmission destination list designated in steps S505, S506, S507, S508, and S509, thereby completing the process shown in FIG. 5.

According to the third embodiment, security can be assured by performing authentication processing, as described above. Also, a user can designates his/her Sender's Address as an image transmission destination (CC) by performing a button pressing operation only one time. Thus, the need for a troublesome user operation is eliminated and the image transmitting apparatus advantageously easy to use can be implemented.

Fourth Embodiment

The configuration of an image transmitting apparatus 100 according to a fourth embodiment of the present invention is the same as that according to the first embodiment. However, the fourth embodiment differs from the first to third embodiments in that user names, passwords, information on a user group and a mail address for a group leader are stored in the external storage device 105. Accordingly, an authentication service for authentication based on authentication data is carried out in the machine.

The operation of the image transmitting apparatus according to the fourth embodiment will be described in detail with reference to FIGS. 6 and 7.

Figure 6:
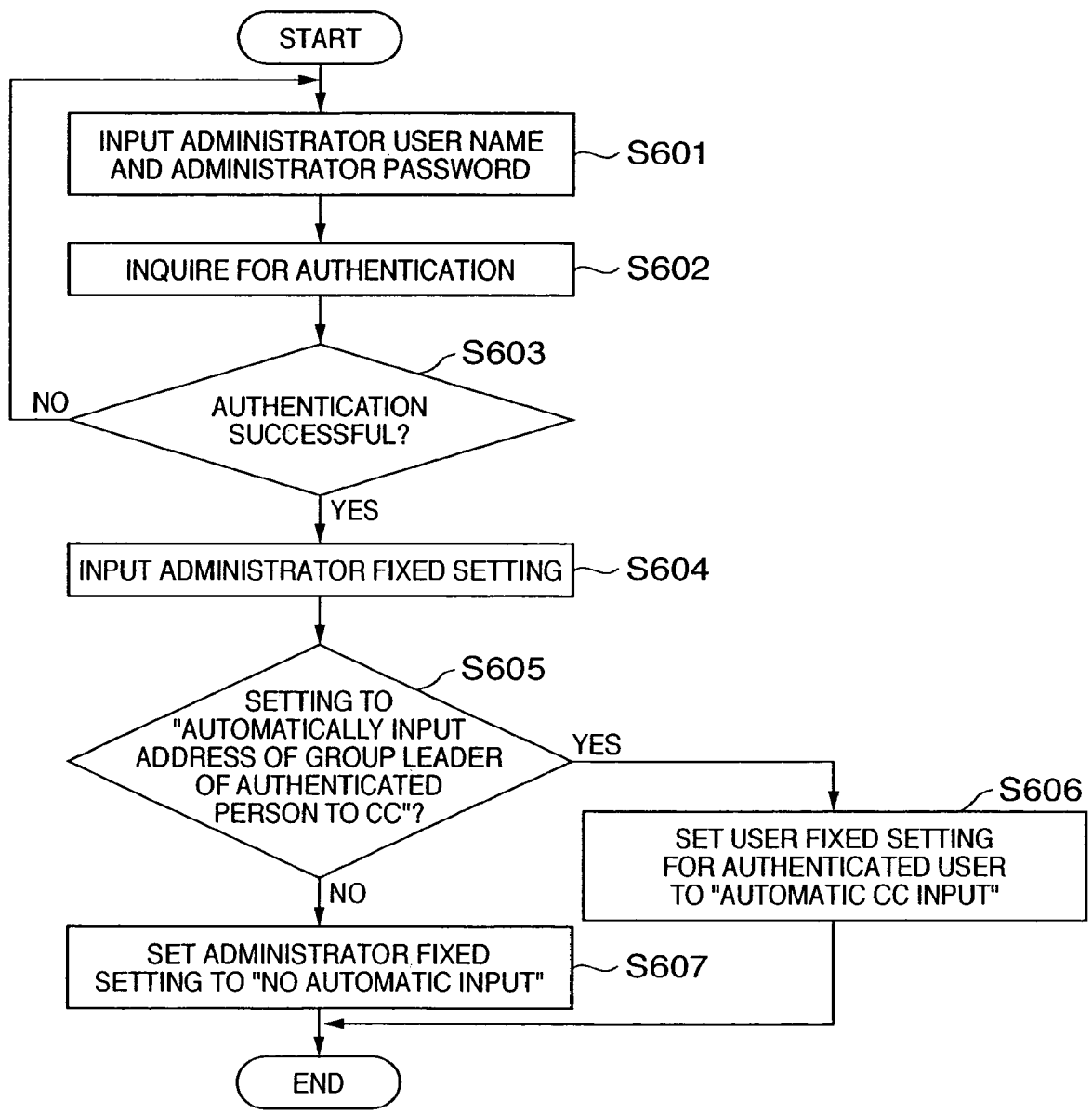
FIG. 6 is a flowchart showing processing for storing a fixed machine setting in the image transmitting apparatus in a case where the image transmitting apparatus is used by identifying a user through authentication in the fourth embodiment.

FIG. 6 is a flowchart showing processing for storing a fixed machine setting in the image transmitting apparatus 100 in a case where the image transmitting apparatus 100 is used by identifying a user through authentication.

According to the operation shown in FIG. 6, a fixed setting of the machine is necessarily used regardless of who the user is. In this respect, this embodiment differs from the third embodiment. This fixed setting cannot be changed by the user within the user's right. The administrator can change the fixed setting only when authenticating his/her identification under the administrator authority.

Referring to FIG. 6, in step S601, an administrator user name and an administrator password for authentication of the administrator authority for changing the fixed machine setting in the image transmitting apparatus 100 are input through the input device 104. In step S602, authentication processing with respect to the authentication service is executed by using the administrator user name and the password.

In step S603, determination is made as to whether or not the authentication is successful. If the authentication is successful, the process advances to step S604 and the operating interface view is opened to grant the image transmitting apparatus 100 administrator authority. If the authentication is unsuccessful, the process returns to step S601 and input of the administrator user name and the administrator password is again awaited, thereby prohibiting execution of the next operation.

In step S604, a fixed setting of each machine stored on a machine-by-machine basis in the external storage device 105 of the image transmitting apparatus 100 is input. The fixed setting of each machine is to "Automatically Input Group Leader's Address as CC Destination" or "Not to Automatically Input Group Leader's Address as CC Destination".

In step S605, determination is made as to whether or not the fixed setting of each machine input in step S604 is a setting to "Automatically Input Group Leader's Address as CC Destination". If the fixed setting corresponds to the "Automatic Input" setting, the setting to "Automatically Input Group Leader's Address as CC" is stored in the external storage device 105 as the fixed setting of the machine in step S606. If "Automatic Input" setting is not set as the fixed setting, a setting "Not to Automatically Input Group Leader's Address as CC" is stored in the external storage device 105 as the fixed setting of the machine in step S407, thereby terminating the process shown in FIG. 6. The address may be set as a CC destination (broadcast destination) or as a BCC destination (anonymous broadcast destination).

Figure 7:
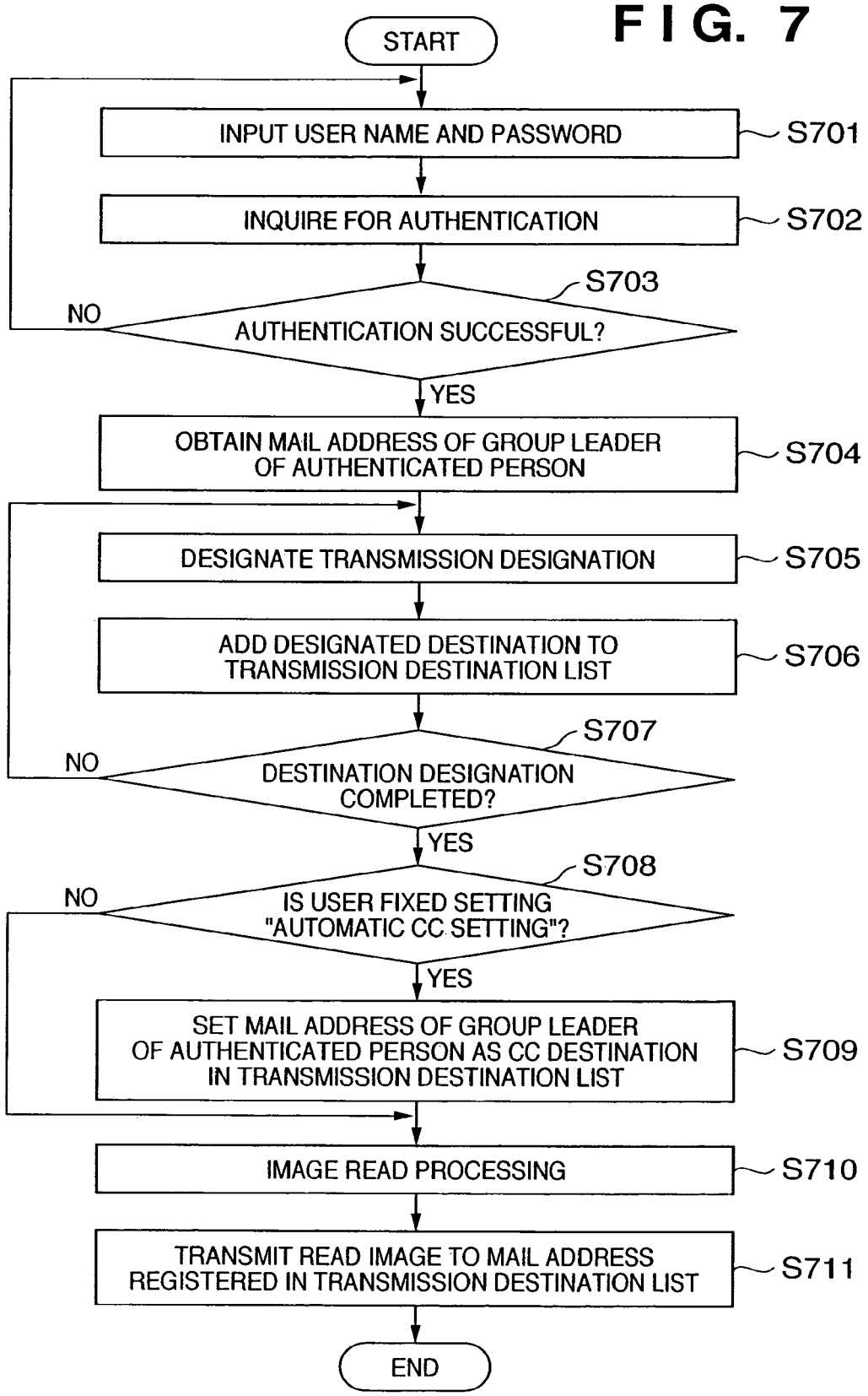
FIG. 7 is a flowchart for explaining the main operation in the fourth embodiment.

FIG. 7 is a flowchart for explaining the main operation in the fourth embodiment.

In step S701, a user name and a password for authentication of the right to use the image transmitting apparatus 100 are input through the input device 104. In step S702, authentication processing with respect to the authentication service is executed by using the User name and the password.

In step S703, determination is made as to whether or not the authentication is successful. If the authentication is successful, the process advances to step S704 and the operating interface view is opened to grant the light to use the image transmitting apparatus 100. If the authentication is unsuccessful, the process returns to step S701 and input of a user name and a password is again awaited, thereby prohibiting execution of the next operation.

In step S704, the mail address of the group leader of the user identified by authentication is obtained from the authentication service. In step S705, a transmission destination is input through the input device 104 or through the touch panel of the display device 103.

In step S706, the input sequence of characters is added as a transmission destination to the transmission destination list. In step S707, determination is made as to whether the destination designation processing is completed. If the destination designation processing is not completed, the process returns to step S705 for input of the next destination. If the destination designation processing is completed, the process advances to step S708.

In step S708, the fixed setting of each machine stored as described with reference to the flowchart of FIG. 6 is referred to. If the fixed setting is to "Automatically Input Group Leader's Address as CC Destination", the process advances to step S709 and the mail address of the group leader of the user obtained in step S704 is added. If the fixed setting is not to "Automatically Input Group Leader's Address as CC Destination", processing in step S709 is skipped.

In step S710, an image is read by the image reading device 107. In step S711, the read image is transmitted to the destinations in the transmission destination list designated in steps S705, S706, S707, S708, and S709 thereby completing the process shown in FIG. 7.

According to the fourth embodiment, a group leader is automatically and forcibly added to the destination list at the time of transmission of a read image according to a fixed machine setting which can be changed only by the administrator. Therefore, information about the contents of an image read and transmitted is transmitted to the group leader without exception, thus removing a security hole through which important image information can be transmitted in secrecy.

Fifth Embodiment

The configuration of an image transmitting apparatus 100 according to a fifth embodiment of the present invention is the same as that according to the first embodiment. Therefore the configuration of the apparatus in the second embodiment will not be described.

Figure 9:
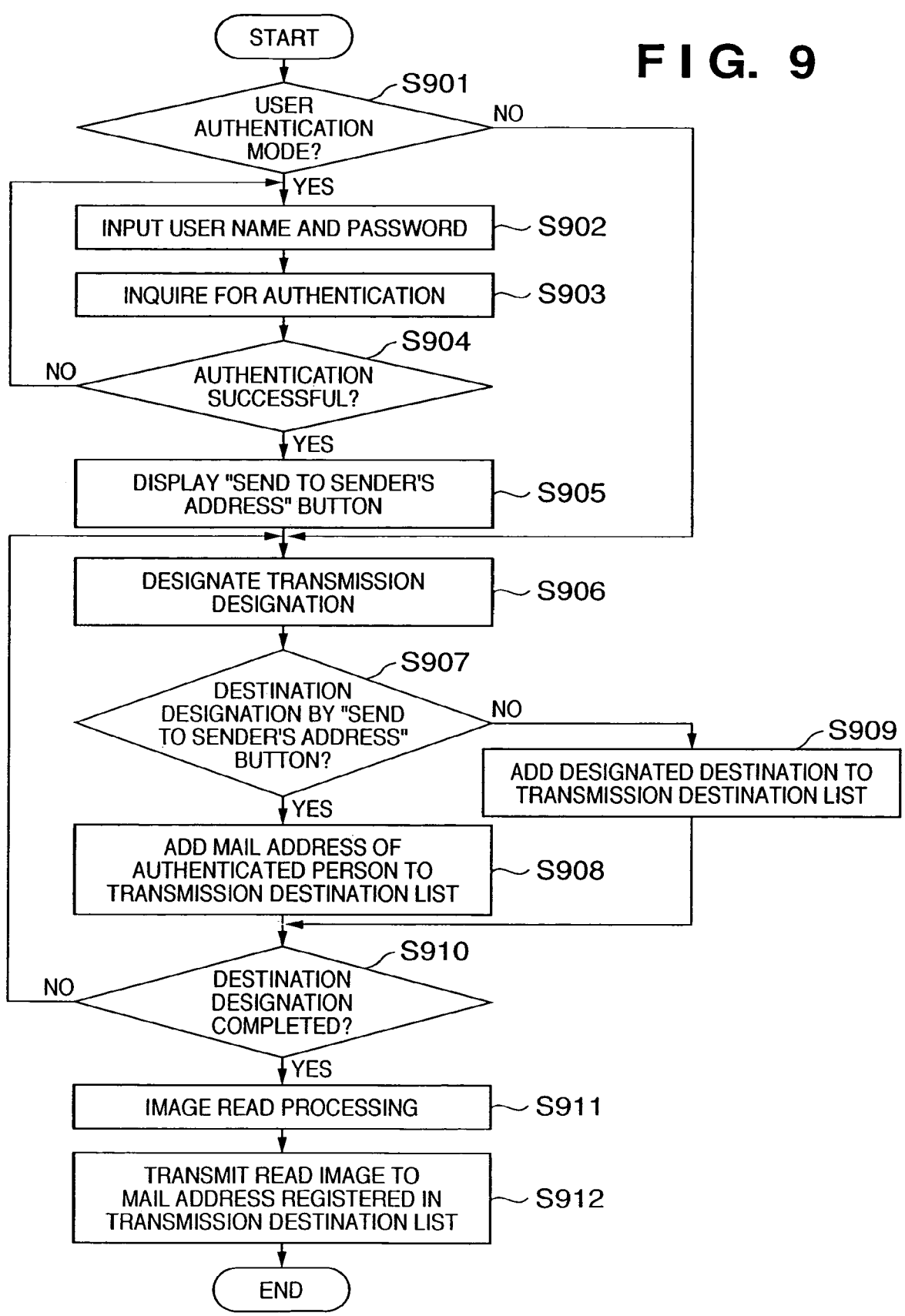
FIG. 9 is a flowchart for explaining the main operation in the fifth embodiment.

The operation of the image transmitting apparatus according to the fifth embodiment will be described in detail with reference to FIG. 9.

In step S901, determination is made as to whether or not the apparatus is set in the "user authentication mode" for performing user authentication. If the apparatus is set in the "user authentication mode" (YES in step S901), the process advances to step S902. If the apparatus is not set in the "user authentication mode" (NO in step S901), the process moves to step S906.

In step S902, a user name and a password for authentication of the right to use the image transmitting apparatus 100 are input through the input device 104.

In step S903, authentication processing is executed by the authentication server 109.

In step S904, determination is made as to whether or not authentication in step S903 is successful. If the authentication is successful (YES in step S904), the process advances to step S905 and the operating interface view is opened to grant the right to use the image transmitting apparatus 100. If the authentication is unsuccessful (NO in step S904), the process returns to step S902 and input of a user name and a password is again awaited, thereby prohibiting execution of the next operation.

In step S905, the mail address of the user identified by authentication is obtained from the authentication service and the "Send to Sender's Address" button is displayed on the display device 103. It is possible to immediately designate the Sender's Address by pressing the "Send to Sender's Address" button without inputting the sequence of address characters.

In step S906, a transmission destination is input through the input device 104 or through the touch panel of the display device 103 to be displayed. Alternatively, the "Send to Sender's Address" button in step S905 is pressed to designate the destination.

In step S907, determination is made as to whether or not the "Send to Sender's Address" button is pressed. If it is determined that the "Send to Sender's Address" button is pressed (YES in step S907), the process advances to step S908 and the address of the authenticated user obtained in step S905 is added to the transmission destination list. If it is determined in step S907 that the "Send to Sender's Address" button is not pressed (NO in step S907), the process moves to step S909 and the sequence of characters input in step S906 is added as a transmission destination to the transmission destination list.

After execution of processing in steps S908 and S909, determination is made in step S910 as to whether or not destination designation processing is completed. If the processing is not completed, the process returns to step S906 for input of the next destination. If the processing is completed, the process advances to step S911.

In step S911, an image is read by the image reading device 107. In step S912, the read image is transmitted to the destinations in the transmission destination list designated in steps S906, S907, S908, and S909.

According to the fifth embodiment, the display of the "Send to Sender's Address" button is changed according to whether or not the apparatus is set in the "user authentication mode", as described above. Thus, the image transmitting apparatus can be implemented so as to have improved convenience according to the operating mode.

While the "Send to Sender's Address" button is not displayed if the apparatus is not set in the "user authentication mode" as described above, the arrangement may alternatively be such that the "Send to Sender's Address" button is set in a non-operable state, although it is displayed. Preferably, the form in which the button in the non-operable state is displayed is different from the form in which the button in the operable state is displayed.

The arrangement may also be such that even when the apparatus is set in the user authentication mode, the "Send to Sender's Address" button is not displayed or is set in a non-operable state if an address associated with an authenticated user is not registered.

While in the above-described embodiments an address associated with an authenticated user is automatically set when the "Send to Sender's Address" button is pressed, a procedure described below may be adopted. If after the completion of authentication of a user a transmission command is input (the start key is pressed) without performing any destination designating operation, an address associated with the authenticated user is automatically set and transmission is executed.

Also, the arrangement may be such that details of operations executed after user authentication are stored as a record on a user-by-user basis in the external storage device 105 for example, and the stored information is used again when user authentication is performed. That is, when a user is authenticated, a certain number of transmission destinations, e.g., five to ten transmission destinations in the transmission destinations designated in the past by the user performing a predetermined operation (destinations selected from the address book or input through a software keyboard) are displayed to enable designation of some of them.

According to the above-described embodiments, the operability of the image transmitting apparatus at the time of transmission of an image can be effectively improved.

While transmission of image data obtained by reading an image on an original with the scanner has been described by way of example in the description of the embodiments, image data stored in the external storage device 105 may be designated and transmitted instead of image data from the scanner. As data stored in the external storage device 105, printing data such as PDL data received through a network, accompanying image file data contained in electronic mail data received by the IFAX function using an electronic mail protocol, image data received by a facsimile function using the G3 procedure or the like, image data obtained with the scanner and stored, etc., may be used. The external storage device 105 may be divided into a plurality of memory boxes. A desired one of the memory boxes may be selected and desired image data in the selected memory box may be successively designated. When a user is authenticated, the memory box operable only by the authenticated user may be displayed and desired image data may be selected from the memory box.

Other Embodiments

A recording medium on which program codes of a piece of software for realizing the functions of each of the above-described embodiments may be provided in a system or an apparatus. The present invention can also be attained by a computer (or CPU or MPU) of the system or apparatus executing the program codes stored on the storage medium. In such a case, the program codes themselves, read out from the storage medium, realize the functions of each of the above-described embodiments, and the storage medium on which the program codes are stored constitutes the present invention. For example, as a storage medium for supplying such program codes, a floppy (trademark) disk, a hard disk, an optical disk, a magneto-optical disk, a compact-disk read-only memory (CD-ROM), a compact disk-recordable (CD-R), a magnetic tape, a nonvolatile memory card or a ROM can be used.

The functions of each of the above-described embodiments can be realized by executing the program codes read out by the computer. Further, the present invention comprises making an operating system (OS) or the like which runs on the computer perform part or the whole of actual processing according to instructions based on the program codes to realize the functions of each of the above-described embodiments.

Further, the present invention comprises a case where the program codes read out from the storage medium are written to a memory provided in a function expansion board inserted in the computer or a function expansion unit connected to the computer, and where a CPU provided in the expansion board or the function expansion unit performs part or the whole of actual processing to realize the functions of each of the above-described embodiments.

Also, the program codes of the software for realizing the functions of each of the above-described embodiments may be distributed through a network to be stored by a storage means, e.g., a hard disk or a memory, or on a storage medium, e.g., a CD-RW or CD-R in the system or apparatus. The present invention can also be attained by making the computer in the system or apparatus (or CPU or MPU) read out and execute the program codes stored by the storage means or on the storage medium.

As many apparently widely different embodiments of the present invention can be made without departing from the spirit and scope thereof, it is to be understood that the invention is not limited to the specific embodiments thereof except as defined in the claims.

CLAIM OF PRIORITY

This application claims priority from Japanese Patent Application No. 2004-250937 filed on Aug. 30, 2004 and No. 2005-226533 filed on Aug. 4, 2005, which are hereby incorporated by reference herein.

What is claimed is:

1. An image transmitting apparatus comprising:
a display;
a scanner that reads an original;
a start key that receives an instruction to start reading the original by the scanner;
a memory that stores programs; and
a processor that executes the programs to:
(1) identify a user;
(2) automatically acquire a mail address having been registered in advance for the identified user; and
(3) determine whether one or more destinations has been designated; and
(4) transmit, in a case where the instruction to start reading the original by the scanner is received via the start key without a user's designation operation of destination information, image data corresponding to the read original using the acquired mail address as the destination information,
wherein the processor performs control to transmit, in a case where a designation of destination information including a mail address input by the identified user and not including the acquired mail address is performed, the image data using the destination information designated by the user without using the acquired mail address.

2. The image transmitting apparatus according to claim 1, wherein the user is identified by authentication of the user.

3. The image transmitting apparatus according to claim 1, wherein the programs are further executed by the processor to control the display to display, after the mail address of the identified user is acquired, a screen for a destination input process using an address book, and
wherein a user's designation of destination information is performed based on an input process using the address book via the screen.

4. A method for controlling an image transmitting apparatus having a scanner, the method comprising:
receiving, by a start key, an instruction to start reading an original by the scanner;
generating image data by reading the original by the scanner;
identifying a user;
automatically acquiring a mail address having been registered in advance for the identified user;
determining whether one or more destinations has been designated;
performing control to transmit, in a case where the instruction to start reading the original by the scanner is received via the start key without a user's designation operation of destination information, the image data using the acquired mail address as the destination information, and
performing control to transmit, in a case where a destination of destination information including a mail address input by the identified user and not including the acquired mail address is performed, the image data using the destination information designated by the user without using the acquired mail address.

5. The method according to claim 4, wherein the user is identified by authentication of the user.

* * * * *